United States Patent
Mandell

(10) Patent No.: US 8,645,530 B2
(45) Date of Patent: Feb. 4, 2014

(54) METHOD AND APPARATUS OF ESTABLISHING COMPUTER NETWORK MONITORING CRITERIA

(75) Inventor: Corey Dana Mandell, Bothell, WA (US)

(73) Assignee: Kaseya International Limited, Jersey (*) Notice: Subject to any disclaimer, the term of this patent is extended or adjusted under 35 U.S.C. 154(b) by 390 days.

(21) Appl. No.: 13/032,311

(22) Filed: Feb. 22, 2011

(65) Prior Publication Data

US 2012/0215905 A1 Aug. 23, 2012

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| 6,944,408 B2 * | 9/2005 | Holzner ........................... 399/24 |
| 2011/0264821 A1 * | 10/2011 | Van Leekwijck et al. .... 709/235 |
| 2011/0307591 A1 * | 12/2011 | Sugata et al. ................. 709/223 |

* cited by examiner

*Primary Examiner* — Larry Donaghue

(57) ABSTRACT

A method and apparatus of monitoring computer devices operating on a network is disclosed. Computer devices are all different and require monitoring settings that are tailored to their specific requirements. One example method of automatically configuring a set of monitoring requirements may include creating initial monitor counter values at a computing device and monitoring at least one computer based on the initial monitor counter values. Additional operations may include calculating override monitor counter values based on the monitoring of the at least one computer, and monitoring the at least one computer based on the override monitor counter values. The override values may be better suited for the device(s) being monitored and may replace the previously used monitoring settings.

20 Claims, 8 Drawing Sheets

METHOD AND APPARATUS OF ESTABLISHING COMPUTER NETWORK MONITORING CRITERIA

TECHNICAL FIELD OF THE INVENTION

This invention relates to a method and apparatus of automatically establishing computer device monitoring criteria, and, more specifically, to calculating an override value of monitor sets and implementing an auto-learn feature to collect data and increase and/or decrease a monitoring threshold dynamically.

BACKGROUND OF THE INVENTION

Automated computer device monitoring services are commonplace in the information technology world today. All types and variations of computers, handheld devices, laptops, smartphones, servers, terminals or other computing devices are generally part of a communication network. As a result, computing devices have been utilizing automated network services to centrally manage and monitor various features, such as, device performance and activity. For example, a laptop or desktop computer operated by an employee of a corporation may receive multiple daily management processes from a remote server during the course of day.

Examples of management processes may include monitoring services which monitor and/or maintain records of processor use, memory availability, application use, hard disk space, updated software drivers and patches, etc. However, it is not a simple task to monitor hundreds or even thousands of computers across an entire enterprise. For instance, the individual computers have customized applications and vary in the amount of memory and other resource objects utilized by the computers. Furthermore, in the event that a user's computer objects are exceeding optimal device settings and/or are below optimal resource thresholds, it may be necessary to alarm the monitoring service so that appropriate action may be taken.

Previous monitoring applications require a customized or individualized "monitor set" of objects and corresponding thresholds which must be established to designate a set of alarms. For example, for each computing device to be monitored, counters may be used as numerical representations of monitored items. The returned values of counters may vary depending on the types and setup configurations of different machines. Varying counter values are a regular occurrence since common monitoring objects, such as disk space, memory, etc. differ significantly per computing device.

Previous monitoring procedures require the network administrator to perform the time-consuming, expensive and arduous task of creating individual monitor sets for each computing device on a network. Across an entire enterprise, the number of different monitor sets may be in the hundreds or even the thousands.

SUMMARY OF THE INVENTION

One embodiment of the present invention may include a method of monitoring computer devices operating on a network. The method may include creating initial monitor counter values at a computing device, monitoring at least one computer based on the initial monitor counter values, calculating override monitor counter values based on the monitoring of the at least one computer, and monitoring the at least one computer based on the override monitor counter values.

Another example embodiment of the present invention may include an apparatus configured monitor computer devices operating on a network. The apparatus may include a processor configured to create initial monitor counter values, monitor at least one computer based on the initial monitor counter values, calculate override monitor counter values based on the monitoring of the at least one computer, and monitor the at least one computer based on the override monitor counter values.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
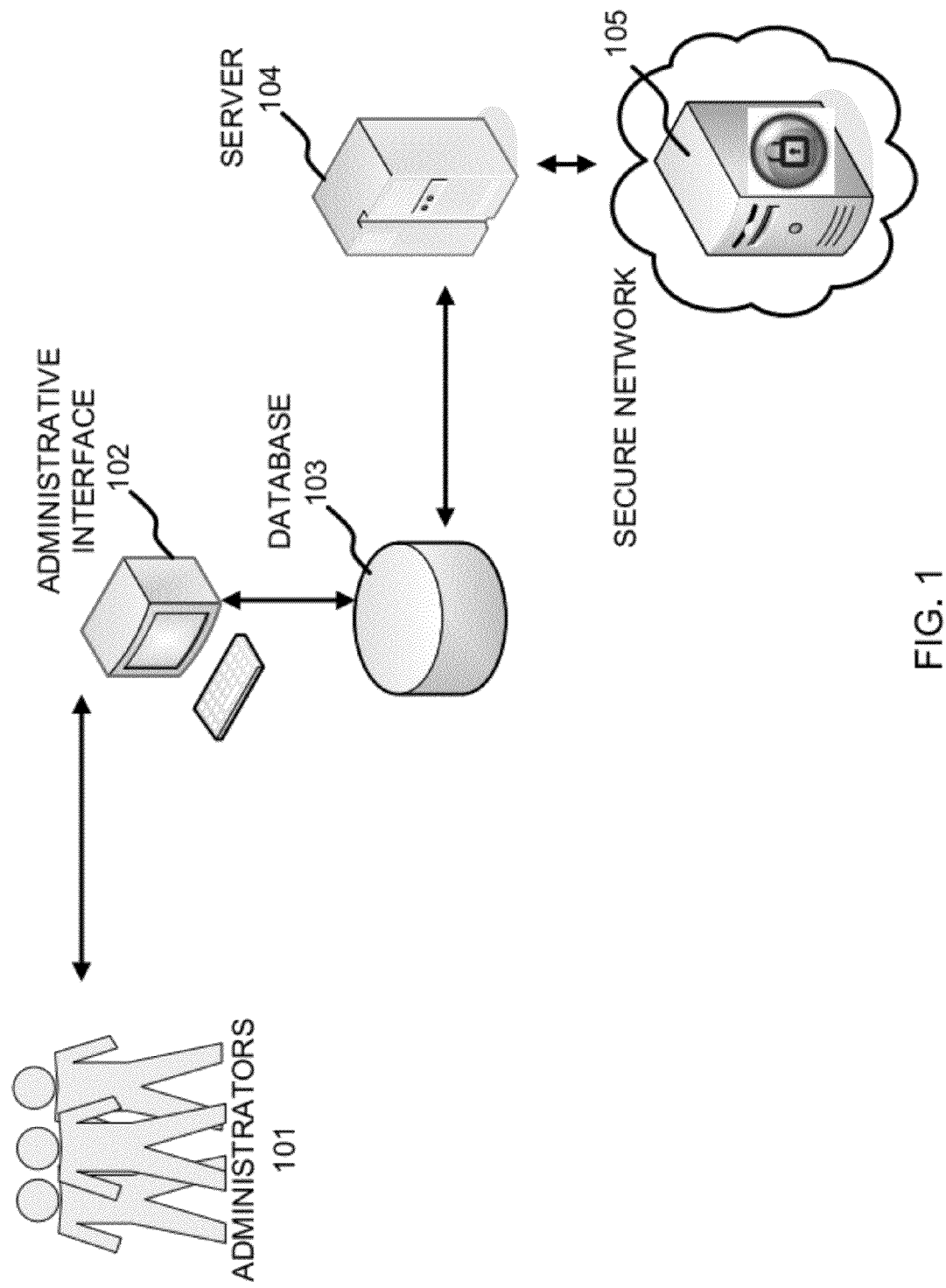
FIG. 1 illustrates an example network configuration, according to example embodiments of the present invention.

FIG. 1 illustrates an example communication network, according to example embodiments of the present invention. Referring to FIG. 1, administrators 101 may access an administrative user interface 102 to begin operating a monitoring procedure. The interface may be a virtual array processor (VSA) interface that is accessible via a user terminal computer or other interface device. The VSA interface is a functional interface that may be used to perform operations and functions and control program execution.

The administrators 101 may perform assignments to setup a "monitor set" of parameters. The monitor set may include objects and corresponding thresholds defined by counters. The objects that may be monitored may include computer parameters, such as, processor use, memory availability, application use, hard disk space, updated software drivers and patches, etc. The counters may represent a number associated with the corresponding object levels. For example, a counter may be returned for a particular object indicating the level of disk space remaining and/or an amount of memory being utilized, etc.

Thresholds may be set when the objects are defined. For instance, an object, such as, disk space, may be defined with a corresponding counter indicating 90% usage. The threshold may be set to alarm the administrator when the amount of disk space is less than 10% or the difference of 90% and 100%. The threshold may be mapped to a single numerical value and may be compared to the measured disk space counter value. The monitor set may include one or more objects to be monitored and their corresponding threshold values. By assigning threshold values for the objects, the monitor set may be adapted for any computer on the network without requiring customized settings for individual hardware profiles.

An automatic learning ("auto-learn") procedure may be used to create a new monitor set. The auto-learn procedure may be used to monitor current operating conditions of computers on the network and dynamically set new threshold values. Certain logic may be established as data collectors, which are used to guide the auto-learn procedure. For example, the amount of time or the duration of time that data is collected indicating the usage levels of certain objects of the network computers, may be a defined logic collector. The interval amount by which to increase or decrease the alarm threshold value may be defined as a maximum or minimum value that should not be exceeded or undermined under any circumstances, etc.

The auto-learn procedure may be setup and executed based on a trial run or test procedure of monitoring the behavior of one or more computers on the network. Initially, a baseline or predefined monitor set may be deployed based on one or more default monitor alarm threshold values. The monitor set may be initiated by the administrative interface 102 and may be used to analyze the compiled or collected user object data stored in the database 103. The server 104 may be setup to perform the monitor set deployment procedure by monitoring the individual customer computers and storing the retrieved object data in the database 103.

Server 104 may also be setup to execute the monitor set deployment and corresponding data result compilation of object data and counter information. One example function may be "MonitorProcessAlarm", which is a monitoring batch process that when executed checks to determine if the amount of time designated by the initial default monitor set has expired, and, if so, an override procedure may be enacted. Another example function performed by server 104 may be a "ProcessMonitorAlarm" process that performs a batch execution procedure every so often (e.g., 1 minute, 2.4 minutes, etc.). Upon executing the "ProcessMonitorAlarm" procedure, a new monitor set is created to replace the old monitor set with the new monitoring values (e.g., adjusted object threshold alarm values, objects to be monitored, etc.).

Figure 2:
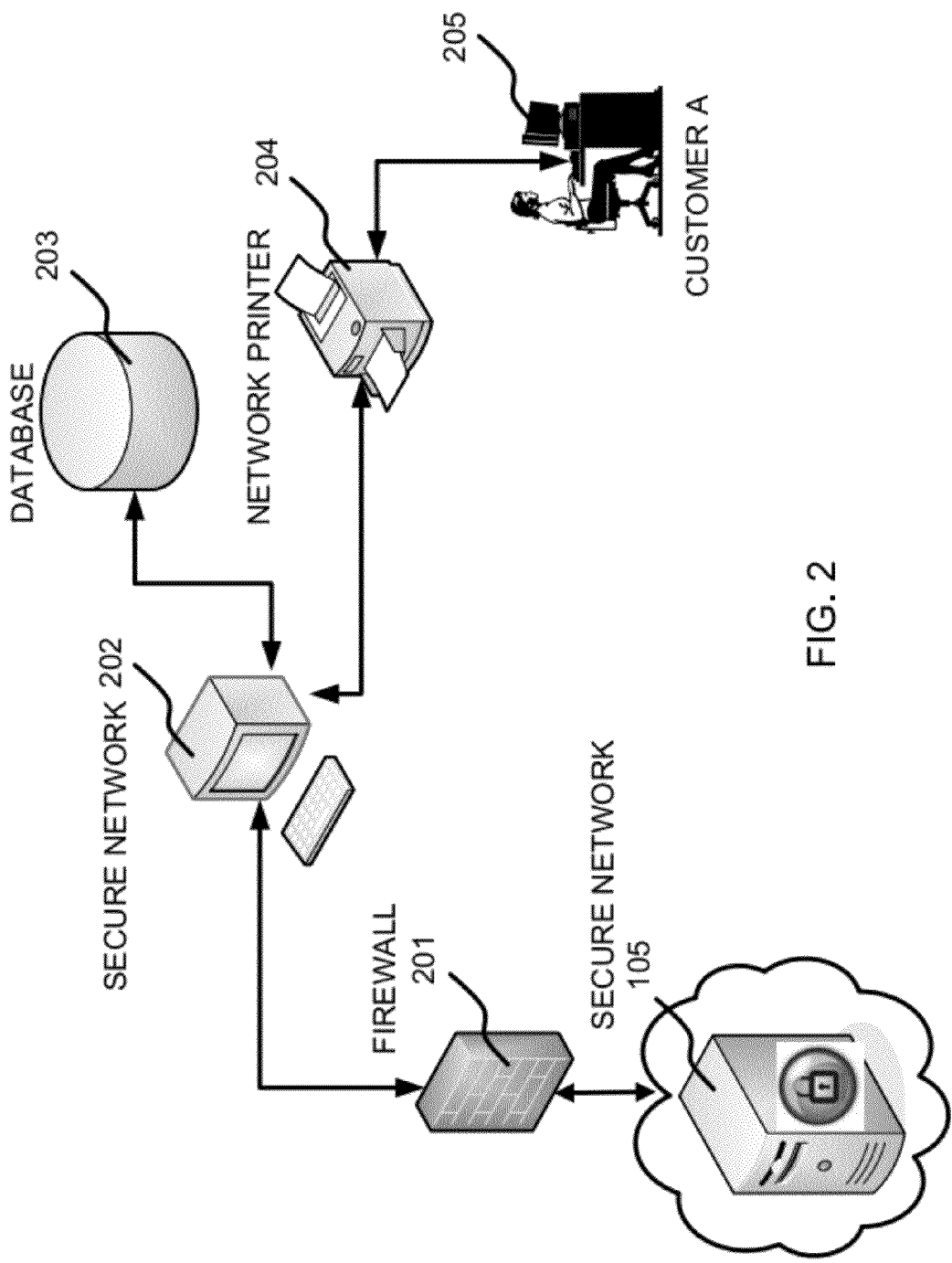
FIG. 2 illustrates another example network configuration, according to example embodiments of the present invention.

Instead of automatically overriding previous monitor set values, the administrator has the capability to manually enter override values used to update the monitor set. Monitoring customer computers may be performed by executing monitoring procedures and accessing customers remotely via a secure network portal 105. Continuing with the network communication of FIG. 1, the flow of data is further illustrated with reference to FIG. 2. Referring to FIG. 2, the secure network 105 includes a firewall 201 that may be authenticated to obtain access to the customer network. A secure network 202 provides access to customer computers, such as, customer A 205. Other devices on the network may be monitored, such as, a network printer 204, print server or email server, etc. A database 203 may provide access to customer data and related customer information.

Figure 3:
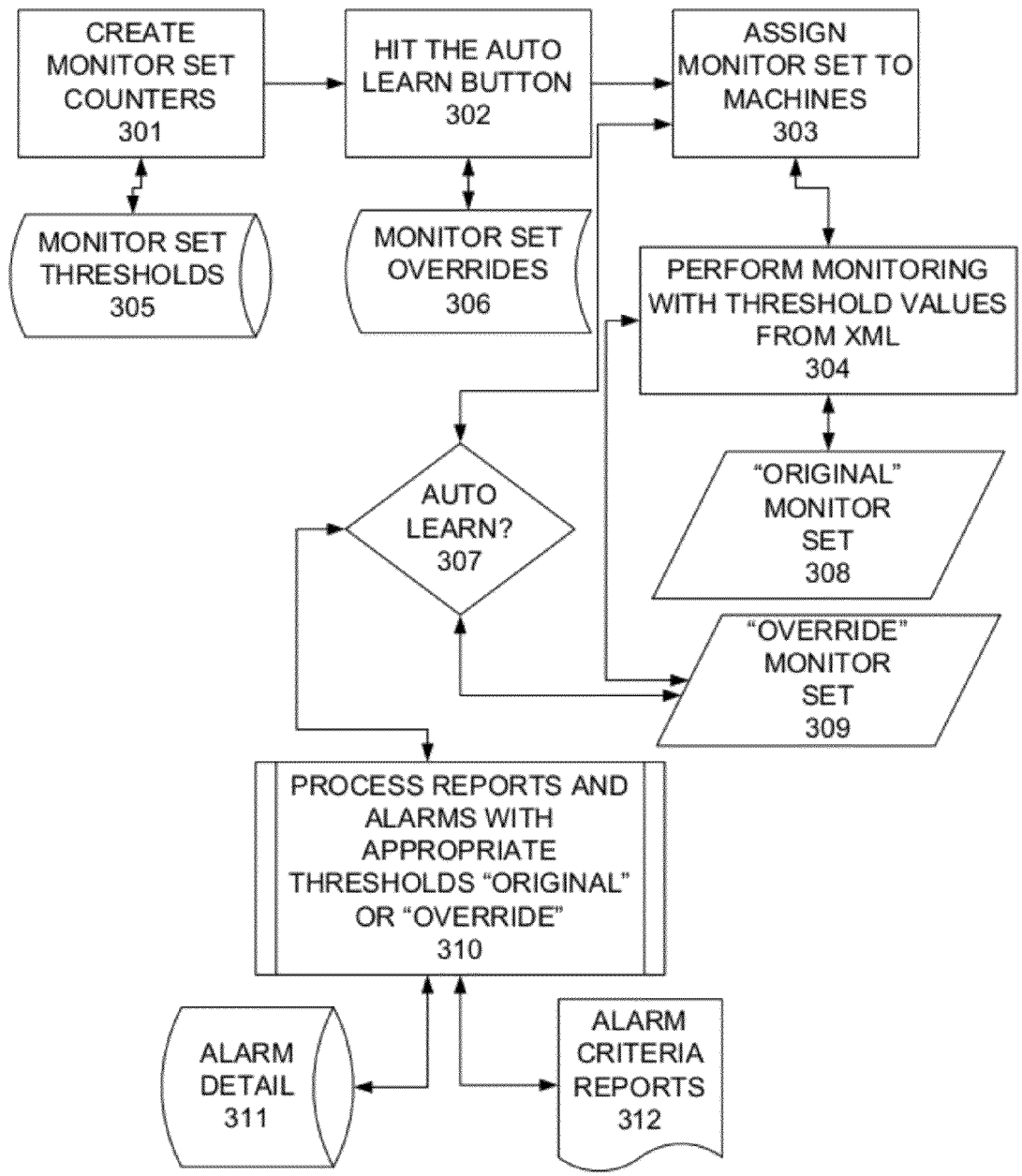
FIG. 3 illustrates an example data flow diagram, according to example embodiments of the present invention.

FIG. 3 illustrates an example flow diagram of operations performed by example embodiments of the present invention. Referring to FIG. 3, initial monitor sets may be created at operation 301 and an auto-learn procedure may be initiated at operation 302. The initial monitor set may be assigned to one or more customer computers at operation 303 and monitoring procedures may begin. Monitor set thresholds stored in memory 305 may be used as initial monitoring alarm values. The auto-learn may be initiated to create override definitions for counters to monitor items that are represented numerically. As monitoring is performed, nominal threshold values may be discovered and the initial threshold values may be overridden by the auto-learn process, at operation 306.

During the monitoring procedure, the initial threshold values and/or the updated new calculated threshold values may be used based on XML data setup by the monitoring function at operation 304. The original monitor set 308 may be replaced by the overriding monitor set 309. At specified intervals (e.g., 1 minute, 2.4 minutes, etc.), the system may perform checks to determine if the override data has been calculated at decision operation 307. If override data has been calculated, then the override data is stored in the override data set 309, and the monitor sets may be modified.

Reports may be processed and alarms may be initiated with the appropriate thresholds either based on the original monitor sets or with the newly calculated override monitor sets at operation 310. The default value will be used until the override calculation definition is met. Then, a new set with the override value is deployed to the monitored computer(s) as data messages. Details of the alarm procedures, such as, when they occurred, the identity of the user computer, etc. may be created and stored in memory at operation 311. Alarm criteria reports 312 may also be setup by the administrator to allow easy access to the specific information that should be reported.

According to example embodiments of the present invention, an original monitor set may have a counter value that was predetermined by the creator of the monitor set. For example, it may be assumed that one of the 'counters' set to monitor in the monitor set is 'CPU utilization' which may be returned as a percentage value. For example, a corresponding alarm may be set to be trigger if the CPU level exceeds 70% for more than 120 seconds. The variable for "X" seconds definable in the monitor set and the interval of 120 seconds may both be setup as part of the monitor set.

One example of a baseline monitor that may be used to monitor most computer devices may be 40% CPU utilization. Such a baseline may be used to represent an acceptable amount of processor utilization that is considered acceptable as an average processor utilization. Conversely, 70% processor utilization for a computer device, or, when such a processor utilization level is elevated to 70% utilization or more for more than two contiguous minutes, it may be prudent to have an alarm triggered.

It is well known that certain computer devices operating on a network may frequently exceed acceptable utilization levels and may 'run hot', meaning that acceptable levels are frequently exceeded. In these instances, it may be prudent to assign an 'auto-learn' feature to the CPU Counter monitor. The 'auto-learn' feature may be configured to use the original 70% alarm level until the 'auto learn' time span (two minutes) has transpired. This provides a customized monitor for the monitor feature on the specific monitor device.

In another example, the defined time span duration may be set to four hours. During such a time span, an average CPU usage may be determined for that period, and 15% may be added which may create another threshold of a 'not to exceed' level of 95%. The newly calculated value (the average of the 4-hour collection of data points plus 15%) may then be used as the new alarm level, which may be referred to as the calculated 'override value'.

Figure 6:
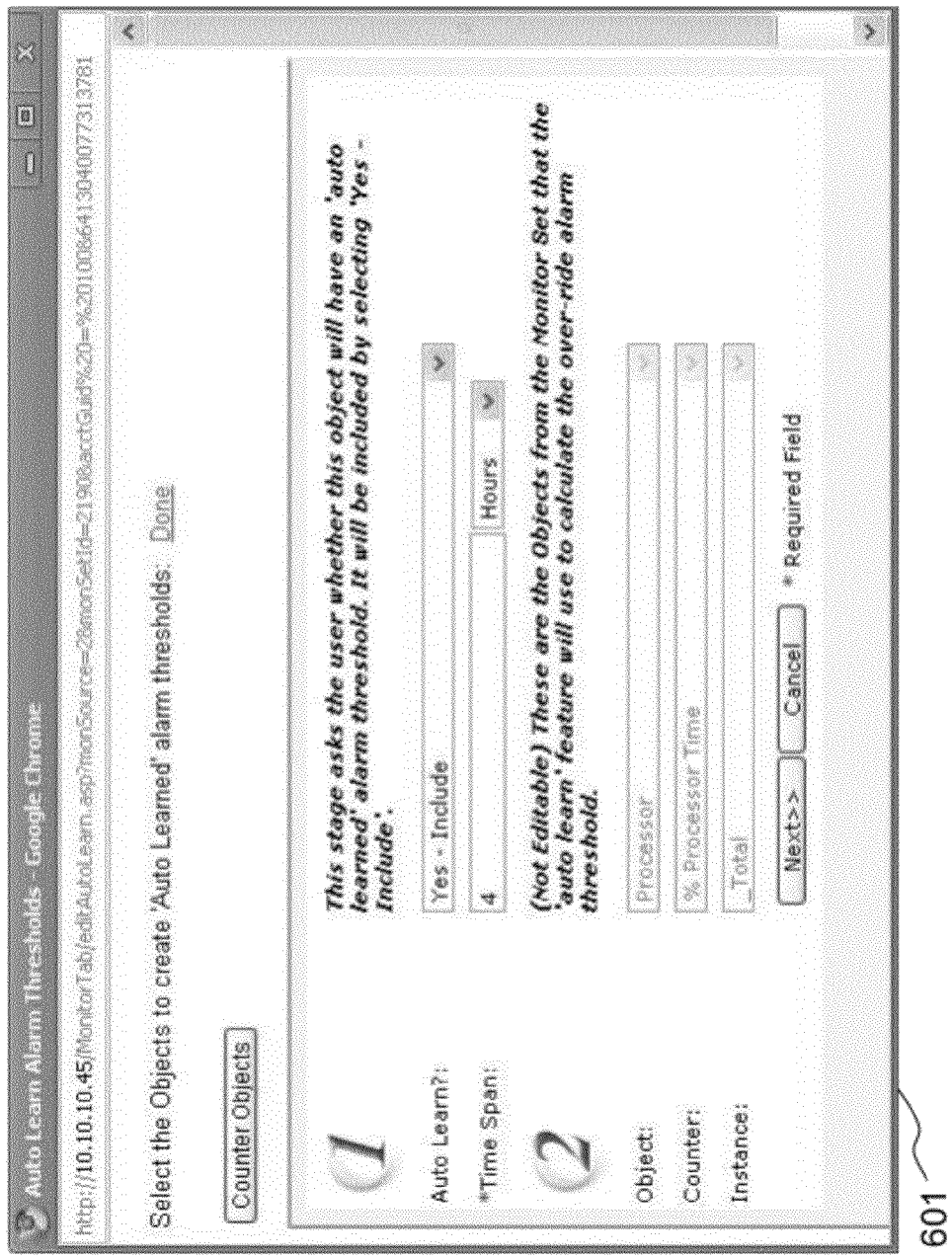
FIG. 6 illustrates an example screenshot GUI, according to example embodiments of the present invention.
Figure 7:
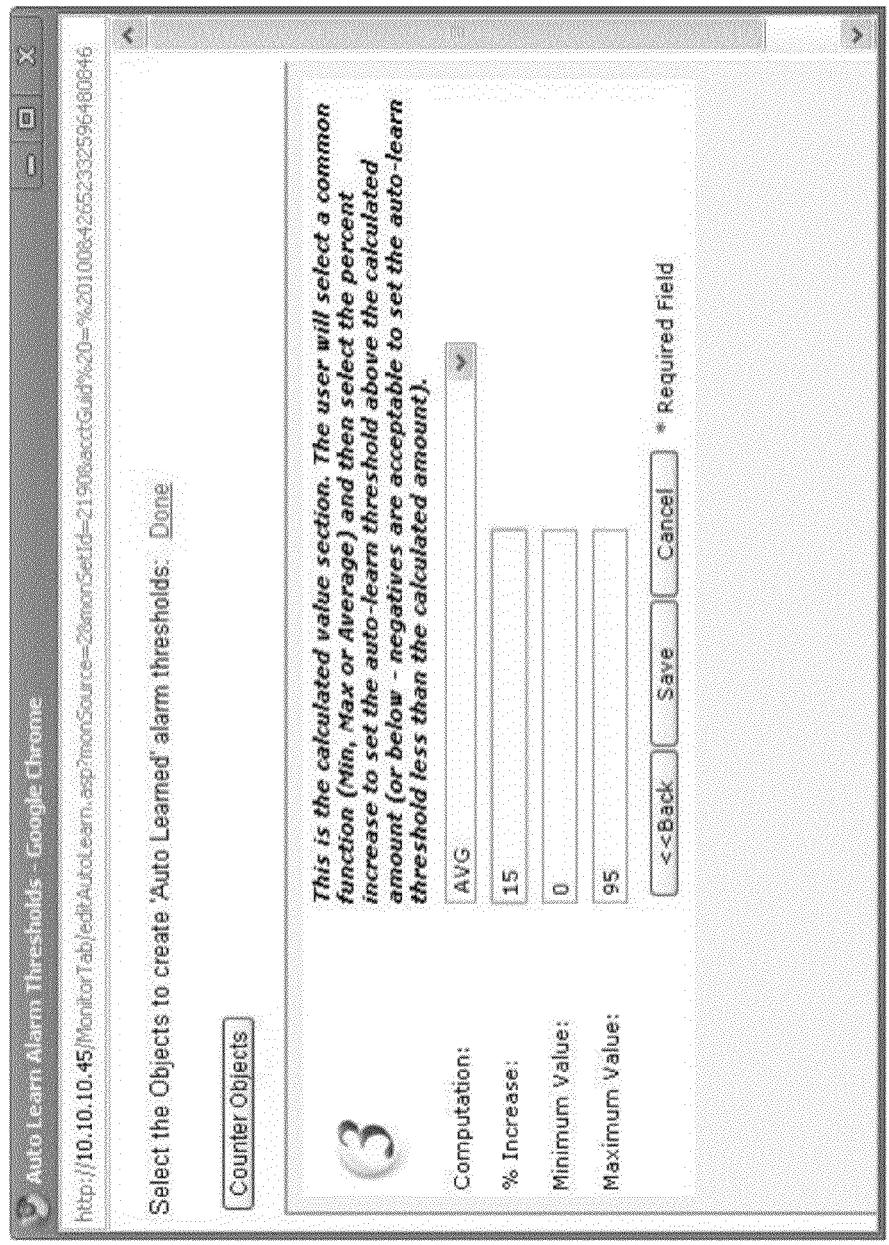
FIG. 7 illustrates another example screenshot GUI, according to example embodiments of the present invention.
Figure 8:
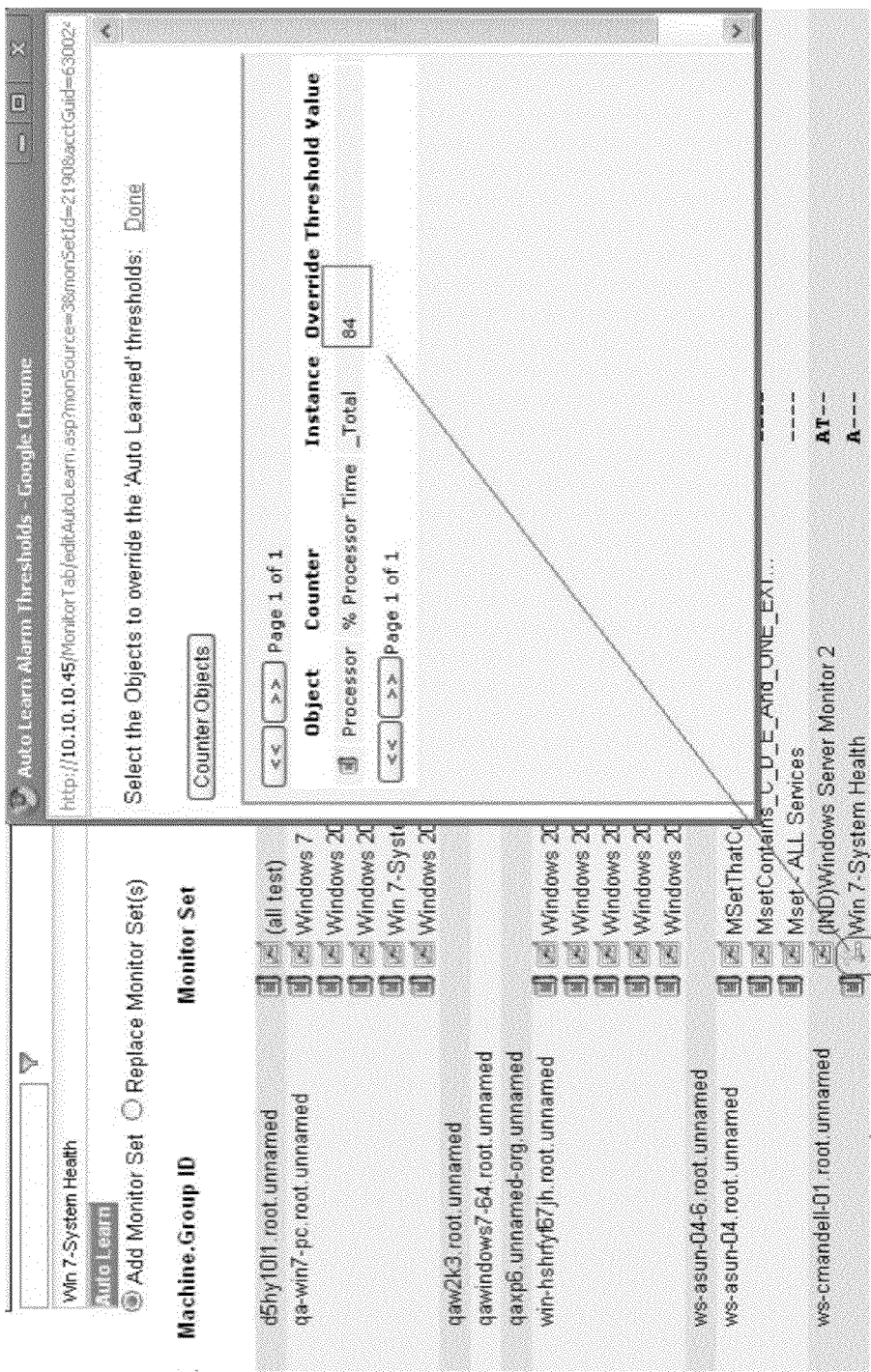
FIG. 8 illustrates yet another example screenshot GUI, according to example embodiments of the present invention.

FIGS. 6-8 illustrate screenshots of graphical user interfaces, according to example embodiments of the present invention. Referring to FIG. 6, screenshot 601 illustrates an example setup interface of the auto-learn procedure and the amount of time designated to performing the auto-learn process. In addition, the object (i.e., processor performance), counter (i.e., processor percentage time) and instance (i.e., total vs. partial) may be selected by the administrator to setup an auto-learn procedure.

FIG. 7 illustrates an example screenshot 701, according to example embodiments of the present invention. Referring to FIG. 7, a computation may be performed to determine the minimum, maximum or average function of a particular object. The user may also select a percentage basis (i.e., 15%) as a basis for increasing the auto-learn threshold above the calculated amount. Or, alternatively, the percentage may be decreased to set the auto-learn threshold to a level below the calculated amount.

FIG. 8 illustrates an example screenshot 801, according to example embodiments of the present invention. Referring to FIG. 8, a particular machine may be audited based on a predefined monitor set. The results are illustrated as a function of processor time % over the instance of the predefined time interval to produce a particular processor override value, which may be substituted for a previous threshold value. The auto-learn procedure may provide a way to establish optimal monitoring values for various different objects associated with network devices.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components 102, 103, 104, 105, 201, 202 and 203.

Figure 5:
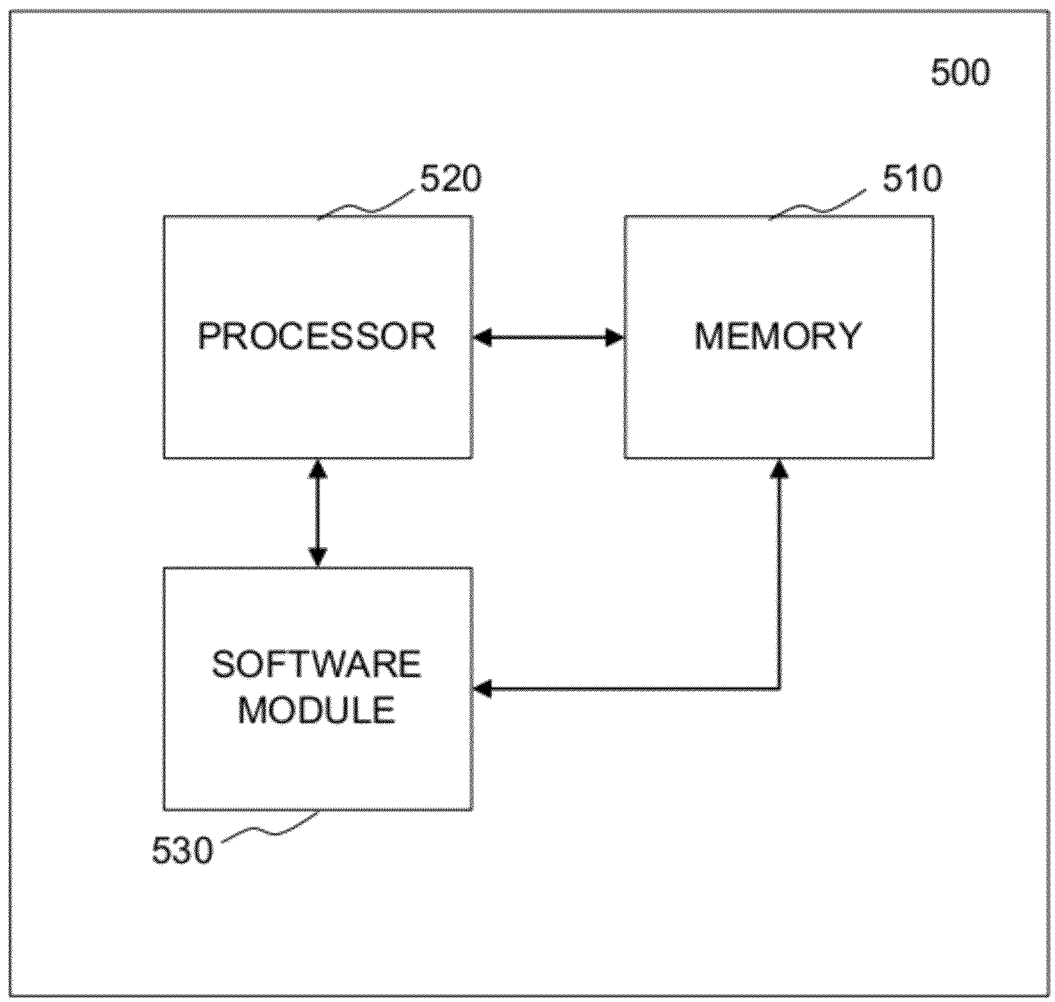
FIG. 5 illustrates an example network entity configured to store and execute any of the example applications described in the specification, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 4:
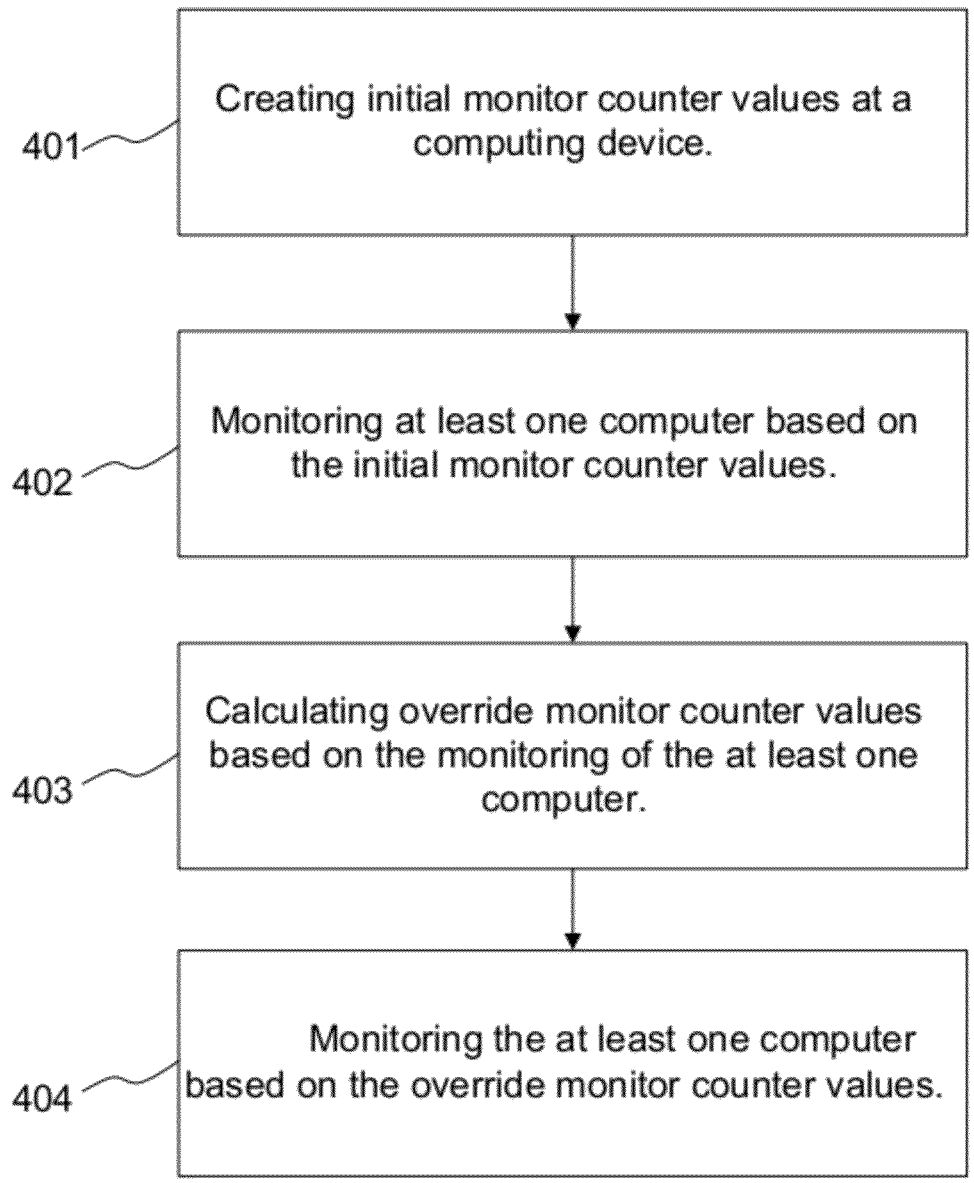
FIG. 4 illustrates an example method, according to example embodiments of the present invention.

One example method of monitoring computer devices operating on a network is illustrated in the flow diagram of FIG. 4. Referring to FIG. 4, operation 401 illustrates creating initial monitor counter values at a computing device. The method may also include monitoring at least one computer based on the initial monitor counter values, at operation 402, and calculating override monitor counter values based on the monitoring of the at least one computer, at operation 403. Additional operations may include monitoring the at least one computer based on the override monitor counter values, at operation 404.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of monitoring computer devices operating on a network, the method comprising:
   creating initial monitor counter values at a computing device;
   monitoring at least one computer based on the initial monitor counter values;
   calculating override monitor counter values based on the monitoring of the at least one computer; and
   monitoring the at least one computer based on the override monitor counter values without creating individual monitor sets for each computing device on the network.

2. The method of claim 1, wherein the initial monitor counter values are threshold values that trigger an alarm when the threshold values are exceeded.

3. The method of claim 1, further comprising:
   executing an automatic learning procedure that calculates the override monitor counter values during monitoring of the at least one computer based on the initial monitor counter values, and replaces the initial monitor counter values with the calculated override monitor counter values.

4. The method of claim 1, wherein the initial counter values and the calculated override monitor counter values are numerical values.

5. The method of claim 1, further comprising:
creating alarm criteria reports based on the results of the monitoring operations and storing the alarm criteria reports in memory.

6. The method of claim 1, wherein the monitoring operations performed on the at least one computer comprise monitoring at least one of processor use, memory availability, application use, hard disk space and updated software drivers.

7. The method of claim 1, further comprising:
performing update check operations at specified time intervals to determine if the override monitor counter values have been calculated.

8. An apparatus configured to monitor computer devices operating on a network, the apparatus comprising:
a processor configured to
create initial monitor counter values,
monitor at least one computer based on the initial monitor counter values,
calculate override monitor counter values based on the monitoring of the at least one computer, and
monitor the at least one computer based on the override monitor counter values without creating individual monitor sets for each computing device on the network.

9. The apparatus of claim 8, wherein the initial monitor counter values are threshold values that trigger an alarm when the threshold values are exceeded.

10. The apparatus of claim 8, wherein the processor is further configured to execute an automatic learning procedure that calculates the override monitor counter values during monitoring of the at least one computer based on the initial monitor counter values, and replaces the initial monitor counter values with the calculated override monitor counter values.

11. The apparatus of claim 8, wherein the initial counter values and the calculated override monitor counter values are numerical values.

12. The apparatus of claim 8, further comprising:
a memory; and
wherein the processor is further configured to create alarm criteria reports based on the results of the monitoring operations, and store the alarm criteria reports in the memory.

13. The apparatus of claim 8, wherein the monitoring operations performed on the at least one computer comprise monitoring at least one of processor use, memory availability, application use, hard disk space and updated software drivers.

14. The apparatus of claim 8, wherein the processor is further configured to perform update check operations at specified time intervals to determine if the override monitor counter values have been calculated.

15. A non-transitory computer readable storage medium comprising instructions that when executed cause a processor to perform monitoring computer devices operating on a network, the processor being further configured to perform:
creating initial monitor counter values at a computing device;
monitoring at least one computer based on the initial monitor counter values;
calculating override monitor counter values based on the monitoring of the at least one computer; and
monitoring the at least one computer based on the override monitor counter values without creating individual monitor sets for each computing device on the network.

16. The non-transitory computer readable storage medium of claim 15, wherein the initial monitor counter values are threshold values that trigger an alarm when the threshold values are exceeded.

17. The non-transitory computer readable storage medium of claim 15, further comprising:
executing an automatic learning procedure that calculates the override monitor counter values during monitoring of the at least one computer based on the initial monitor counter values, and replaces the initial monitor counter values with the calculated override monitor counter values.

18. The non-transitory computer readable storage medium of claim 15, wherein the initial counter values and the calculated override monitor counter values are numerical values.

19. The non-transitory computer readable storage medium of claim 15, further comprising:
creating alarm criteria reports based on the results of the monitoring operations and storing the alarm criteria reports in memory.

20. The non-transitory computer readable storage medium of claim 15, wherein the monitoring operations performed on the at least one computer comprise monitoring at least one of processor use, memory availability, application use, hard disk space and updated software drivers.

* * * * *